(12) United States Patent
Ankeny (10) Patent No.: US 9,296,661 B1
(45) Date of Patent: Mar. 29, 2016

(54) CONTROLLED-RELEASE FERTILIZER COMPOSITION SUBSTANTIALLY COATED WITH AN IMPERMEABLE LAYER

(75) Inventor: Mark Ankeny, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 111 days.

(21) Appl. No.: 13/585,898

(22) Filed: Aug. 15, 2012

(51) Int. Cl.
*C05G 3/00* (2006.01)
(52) U.S. Cl.
CPC ........................................ *C05G 3/00* (2013.01)

(58) Field of Classification Search
CPC ........................................................ C05G 3/00
See application file for complete search history.

(56) References Cited

U.S. PATENT DOCUMENTS

2008/0135245 A1* 6/2008 Smith et al. ................ 166/280.2

* cited by examiner

*Primary Examiner* — Jennifer A Smith
(74) *Attorney, Agent, or Firm* — Jacob A. Heafner; Brian J. Lally; John T. Lucas (57) ABSTRACT

A controlled-release fertilizer composition is provided that is substantially coated with an impermeable layer. The fertilizer composition may further include one or more hollow sections to allow for root penetration and efficient delivery of nutrients.

7 Claims, 6 Drawing Sheets

CONTROLLED-RELEASE FERTILIZER COMPOSITION SUBSTANTIALLY COATED WITH AN IMPERMEABLE LAYER

GOVERNMENT RIGHTS

The United States government has rights in the invention pursuant to Contract No. DE-AC07-05ID14517 between the United States Department of Energy and Battelle Energy Alliance, LLC, as operator of the Idaho National Laboratory.

FIELD OF THE INVENTION

The present invention relates to soil amendment compositions, including nutrients, pesticides, microbes, herbicides, root attractants and combinations thereof.

BACKGROUND

Soil amendments provide a primary means for bolstering plant growth. However, significant quantities of applied soil amendments never reach the roots of plants. Instead, they are lost to bulk soil through sorption, diffusion, leaching and degradation. Using existing technology, more nutrients are immobilized by soil than are used by crops, harming both the agricultural industry and the environment.

Monetary costs that result from the loss of soil amendments burden the agricultural industry, and these costs continue to grow as global reserves of phosphate are depleted. Beyond economic harm, loss of soil amendments is detrimental to the environment. Nitrogen used in nutrients increases the emission of reactive gases that contribute to acid rain and smog. Additionally, a percentage of this nitrogen escapes into the atmosphere as nitrous oxide, which has been identified as a greenhouse gas that traps heat at a rate about three hundred times that of carbon dioxide.

Nitrogen and phosphorus from soil amendments also threaten water quality by accelerating the growth of algae and other aquatic plants. Algal blooms kill fish and harm wildlife and livestock through the production of toxins and by reducing the oxygen content of water. Additionally, accelerated growth of algae and other aquatic plants raise the cost and difficulty of water purification.

Liquid diffusion of soil amendments also detriments plant growth. Plants use a large percentage of their photosynthetically-fixed carbon for nutrient uptake. Consequently, much of a root's energy is lost extracting nutrients from the soil against an energy gradient. Reducing nutrient diffusion in soil solution and subsequent energy spent to re-extract these nutrients could thereby reduce root energy expenditures and increase plant growth.

Current soil amendment compositions do not meet the present need for impermeable soil amendment compositions. Essential to current compositions is the mechanism of delivering amendments through the soil to plant roots by dissolving into the soil water solution and subsequent diffusing from the surface of the composition into the surrounding soil environment. The random movement of soil amendments through three-dimensional space unavoidably results in the loss of amendments, like phosphorus and nitrogen, to the surrounding environment.

For the foregoing reasons, there is a need for a soil amendment composition that provides plant roots with amendments, such as nutrients, pesticides, root attractants, microbes, and combinations thereof, without losses to the surrounding environment attendant existing soil amendment compositions.

SUMMARY

One or more embodiments of the present invention are directed to compositions that satisfy these needs for soil amendments that bolster plant growth with minimal amendment loss to the soil and minimal expenditure of plant root energy. A composition having features of the present invention generally includes a soil amendment particle having one or two open ends, an outer face, a water-impermeable layer substantially covering the outer face of the particle, wherein the impermeable layer does not cover at least one of the first or second end of the particle. Another embodiment of the particle includes an interior hollow section and an inner face that defines the interior hollow section. In various embodiments, one or more interior hollow sections may span the first and second ends of the particle. In alternative embodiments, one or more interior hollow sections only partially extend into the particle from various positions on the outer face of the particle.

One or more embodiments of the present invention improve upon existing soil amendment compositions by reducing the loss of soil amendments to the soil and water systems. Unlike existing compositions that disperse soil amendments from their exterior surface into the surrounding soil environment, the present invention includes a water-impermeable layer that isolates soil amendments from and prevents rapid liquid-diffusion-driven dispersion of the amendments into the surrounding environment. Impermeable coatings include materials that are impermeable to water and withstand degradation in the soil. The impermeable layer covers the outer face of the soil amendment composition, leaving substantially unobstructed one or more interior hollow sections and root access to the amendments.

In one or more embodiments, the open ends of the particles that are not coated with a water impermeable layer, and alternatively or additionally the interior hollow section, further minimize losses of soil amendments. By isolating soil amendments within an impermeable layer, the present invention controls dispersion through the diameter, length and number of air gaps and/or interior hollow sections that limit gas phase water vapor diffusion. As such, the amendment release rate is controlled by the rate of water vapor diffusion from the soil gas phase to the amendment in the particle. In one embodiment, dispersion is substantially restricted by including only a single interior hollow section that only partially extends into the particle through the outer face of the particle. In alternative embodiments, the inner face is coated with a sustained-release layer that degrades over time, further decreasing any loss of soil amendments to the surrounding soil environment. Inclusion of a sustained-release layer on the inner face of the particle becomes more pertinent as the size and number of interior hollow sections increase.

To bolster plant growth with minimal dispersal of soil amendments, one or more embodiments of the present invention utilize a delivery mechanism distinct from existing soil amendment compositions. Rather than deliver soil amendments to plant roots through the soil, root attractant-containing embodiments of the present invention attract plant roots to the soil amendment itself, decreasing soil amendment loss and energy expenditures by plants attendant to nutrient uptake.

To this end, the inner face of one or more embodiments of the invention claimed herein includes an interior root attractant layer, such as glutamate, phosphate, nitrate and combinations thereof. The inner root attractant layer attracts plant roots and guides them into the soil amendment interior hollow section. Through this delivery mechanism, plants access soil amendments before they are lost and without competition from other plants and organisms in the surrounding soil environment.

By directing plant roots to the interior of soil amendments, embodiments of the present invention provide isolated environments for delivering soil anmendments. In one embodiment, the interior hollow section is formulated for improved nutrient uptake by adjusting conditions, such as pH. In another embodiment, the soil amendment includes a microbe. In contrast to existing soil amendments that require microbes to compete with organisms in the surrounding soil, one or more embodiments of the present invention create an isolated environment for a desired microbe to flourish without competition. Such embodiments enhance the effectiveness of amendment microbes over existing soil amendment compositions.

In yet another embodiment, the present invention comprises soil amendments that combine herbicides with beneficial amendments. Through such embodiments, amendments are provided to specific plants that have resistance to the included herbicide. This mechanism improves upon existing bulk applications of herbicides and amendments, by providing a targeted approach that minimizes the impact of herbicides on the surrounding environment.

These and other features, aspects, and advantages of the multiple embodiments of the present invention will become better understood with reference to the following drawings, description, appended claims, and by practice of the invention.

DESCRIPTION OF THE DRAWINGS

Embodiments of the present invention are illustrated in the accompanying figures where.

DETAILED DESCRIPTION

Generally the present invention is directed to a soil amendment composition comprising: a particle having a first end, a second end and an outer face, wherein the particle comprises a soil amendment; and, an impermeable layer substantially covering the outer face of the particle, wherein the impermeable layer does not cover at least one of the first or second ends of the particle. In a futher embodiment, the particle further comprises an interior hollow section spanning the particle first and second end that is defined by an inner face of the particle. Alternatively, the interior hollow section may only partially extend into the particle through the outer face of the particle. In yet another embodiment, the particle is substantially cylindrical. In further embodiments, the diameter of a substantially cylindrical particle is between about 2 and 5 mm and the length is between about 2 and 10 mm. In an additional embodiment, the diameter of the one or more hollow section is between about 0.25 and 2 mm. In one or more embodiments, the soil amendment is selected from the group consisting of nutrients, pesticides, microbes, herbicides and combinations thereof.

Figure 1:
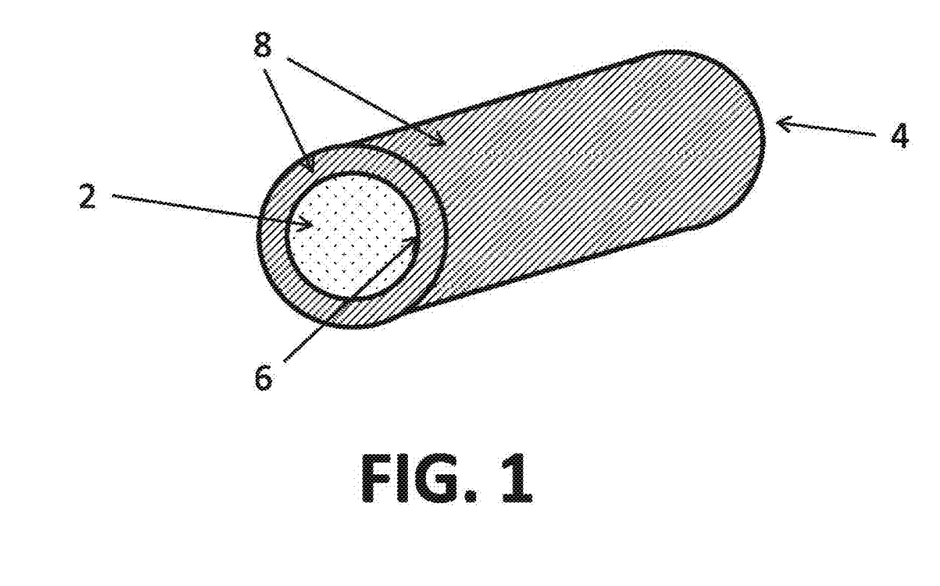
FIG. 1 is a view of one embodiment of a single particle of the present invention.

Referring to FIG. 1, one embodiment of the composition is depicted. The soil amendment particle includes a first end 2, a second end 4, and an outer face 6 substantially covered by an impermeable layer 8. In FIG. 1, the impermeable layer 8 does not cover the first end 2, thereby providing the expected improved performance.

Figure 2:
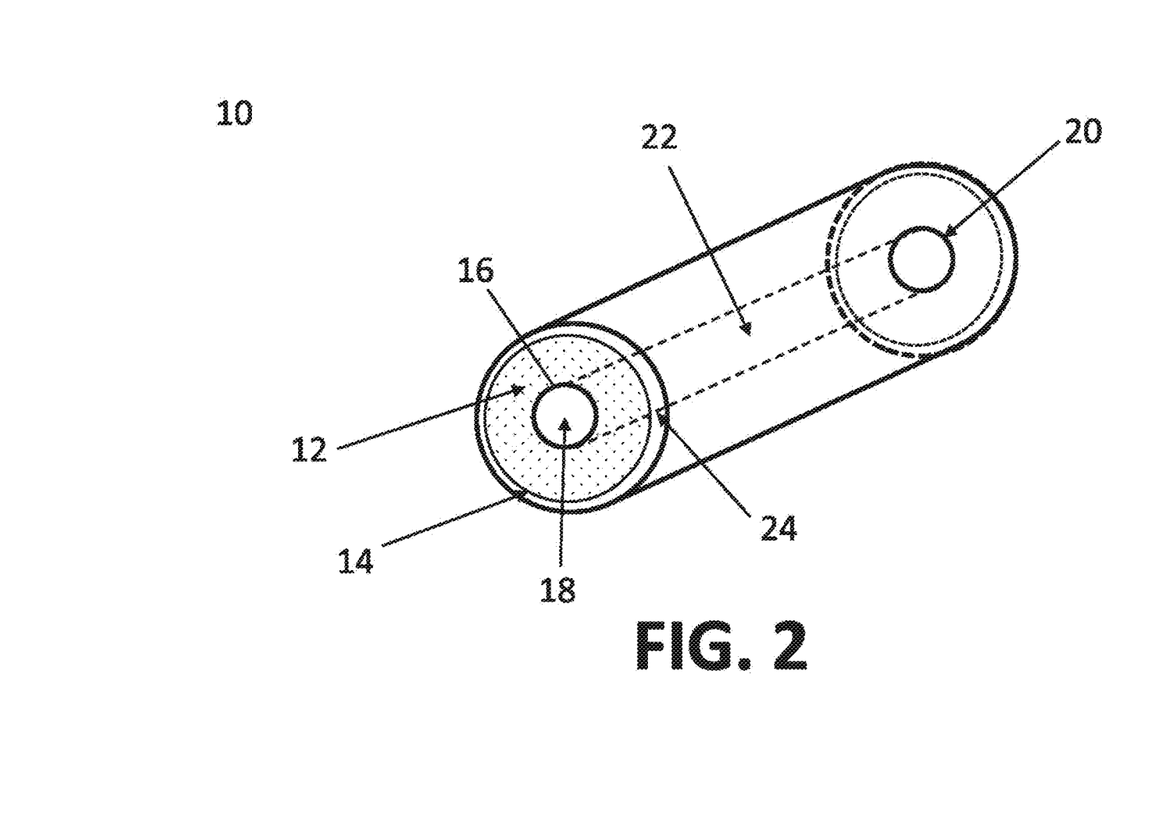
FIG. 2 is a three-dimensional view of one embodiment of a single soil amendment particle consistent with the present disclosure.

Referring to FIG. 2, an embodiment compatible with the present invention is shown as a particle 10. The particle 10 includes a soil amendment particle 12 having an outer face 14 and an inner face 16. The particle 10 is further defined by a first end 18 and a second end 20. The particle 10 may comprise any number of configurations, such as cylinders, squares and spheres. The inner face 16 defines an interior hollow section 22, which is depicted as spanning the particle first end 18 and particle second end 20. Finally, an impermeable layer 24 covers the outer face of the particle.

The particle 10 of FIG. 2 is depicted as a cylinder. In this embodiment, the particle 10 may have a length up to about 6 mm and a diameter between about 2-5 mm. Preferably, the interior hollow section 22 has a diameter between about 1-2 millimeters. One or more embodiments also include any particle configuration capable of supporting an interior hollow section 22 accessible to plant roots. For example, in an alternative embodiment, the particle is a sphere having one or more interior hollow sections. In another embodiment, the particle is an aggregate of spheres, wherein spaces between spheres provide a plurality of interior hollow sections. In yet another embodiment not depicted, the particle has an exploded configuration, like popcorn, providing a plurality of interior hollow sections in a single structure.

A cylinder configuration is preferred due to its ease of manufacture using extrusion technology and ability to accommodate large quantities of plant roots. Popcorn and aggregate configurations are capable of greater interior surface area for roots to uptake amendments than cylinder configurations; however, the greater interior surface area may affect greater losses of soil amendments to the surrounding environment. Spherical configurations are also well suited for accommodating a plurality of interior hollow sections.

The soil amendment 12 comprises a matrix impregnated with organic and inorganic materials, such as nutrients, pesticides, microbes, herbicides and combinations thereof. Any soil amendment formulation will suffice and be compatible with the amendments described herein. In one embodiment, the soil amendment is a nutrient impregnated with about 60 wt. % phosphorus and about 40 wt. % nitrate.

In another embodiment, the soil amendment is a pesticide that may be inorganic, synthetic or biological, including but not limited to algicides, avicides, bactericides, fungicides, miticides, molluscicides, nematicides, rebocides, herbicides, rodenticides, virucides and insecticides (such as organochlorides, organophosphates and carbamates). Such compounds are common in seed treatments where expensive seeds must be protected from a variety of biotic and environmental challenges. Herbicides that disrupt root meristems, such as glyphosate or triflurans can be incorporated into either the coating or into the interior of the pellet to stop root tip growth in the area of the pellet from weeds susceptible to the pesticide. In a similar fashion, insecticides, nematicides or other pesticides can be incorporated to reduce root predation or infection in the uptake zone critical to plant productivity. In an alternative embodiment, the amendment includes a combination of a herbicide, including but not limited to glyphosphate, atrazine, 2,4-D, and a nutrient, including but not limited to compounds containing: macronutrients such as nitrogen, phosphorous, potassium, calcium, magnesium, sulfur and silicon; and/or micronutrients such as boron, copper, chlorine, iron, manganese, molybdenum, zinc and nickel. In yet another embodiment, the amendment includes materials to sustain microbes that are well known in the field. In addition, various embodiments, the soil amendment matrix includes a strengthener, such as polyacrylamide, to bolster structural integrity of the particle. An additional embodiment uses the technology formulated with repellents to reduce plant predation. A compound such as capsaicin, the compound that makes hot peppers 'hot' can be taken up by plant roots and transported to the bark and leaves. This renders the plant unpalatable to mammals including deer, rabbits and rodents that cause extensive damage to both crop and ornamental crops.

The impermeable layer 24 may comprise any coating that is impermeable to water and that will not degrade under the soil conditions. The impermeable layer 24 covers the outer face of the soil amendment composition, leaving substantially unobstructed one or more interior hollow sections and root access to the amendments. Examples of coatings compatible for use as a impermeable layer include but are not limited to generic strengtheners, such as long chain polymers, zero permeability plastic and cornstarch. Preferably, the impermeable coating has a minimal thickness relative to the particle diameter, such as 2 µm or less. However, the coating should be sufficient to provide complete or substantially complete coverage of the particle.

Figure 3A:
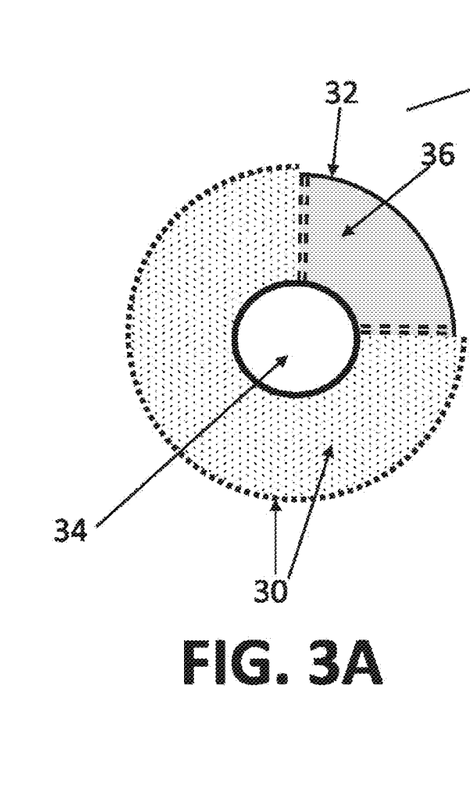
FIG. 3A is a sectional view of the soil amendment of FIG. 1.

FIG. 3A further depicts one or more embodiments of a particle 10. An impermeable layer 30 coats the soil amendment outer face 32, leaving at least an interior hollow space 34 substantially unobstructed. The impermeable layer 30 has a thickness preferably between about 1-2 µm and up to about 5 µm. The impermeable layer 30 creates a diffusion-resistant barrier over the soil amendment 36 that prevents loss of soil amendments to the surrounding environment. An impermeable layer is defined herein as a water impermeable barrier that resists degradation in the soil. Impermeable layers 30 compatible with the present invention include but are not limited to zero permeability plastics, corn starch, polymers and bioplastics derived from manure or paper mill waste.

Figures 3B, 3C:
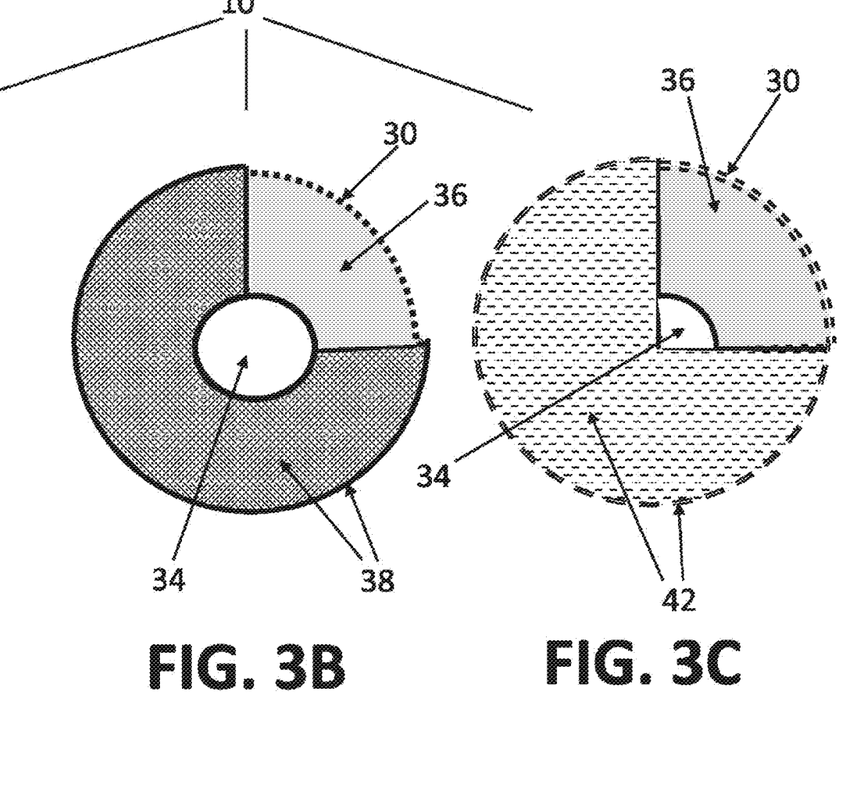
FIG. 3B is a sectional view of the soil amendment of FIG. 1 having an outer root attractant layer over a impermeable coating.
FIG. 3C is a sectional view of a soil amendment compatible with the present invention that includes an outer sustained-release layer.

As shown in FIG. 3B, in an alternative embodiment, an outer root attractant layer 38 covers the impermeable layer 30 and the soil amendment 36, while not obstructing the interior hollow section 34. Root attractants compatible with the present invention include phosphate, glutamate and nitrate. Similar to the impermeable layer 30, the outer root attractant layer 38 has a thickness between about 1-5 microns.

In another embodiment, depicted in FIG. 3C, an outer sustained-release layer 42 encapsulates the impermeable coating layer 30 and the soil amendment 36, covering the one or more interior hollow sections 34. An outer sustained-released coating has a thickness preferably in the range between about 1 and 5 microns. Examples of sustained-release layers compatible with embodiments of the present invention include Osmocote®, sulfur-coated urea, and ESN®, among others.

Figure 4A:
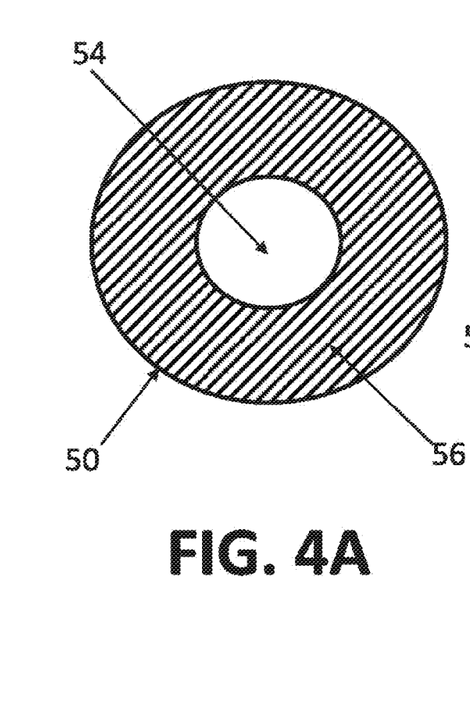
FIG. 4A is an anterior view of the soil amendment of FIG. 1.

FIG. 4A shows a cross-section of one embodiment of a fertilizer composition having an impermeable coating layer 50 coating a soil amendment 56, but not obstructing the interior hollow section 54. The interior hollow section 50 is dimensioned to optimize the entry of plant roots. To this end, various embodiments of the present invention have one or more interior hollow sections 54 with diameters between about 1-5 mm and preferably between about 2-3 mm. Interior hollow sections 54 of any diameter capable of admitting plant root tips are compatible with the present invention; however, as the diameter increases, the loss of soil amendments to the surrounding environment also potentially increases.

Figure 4B:
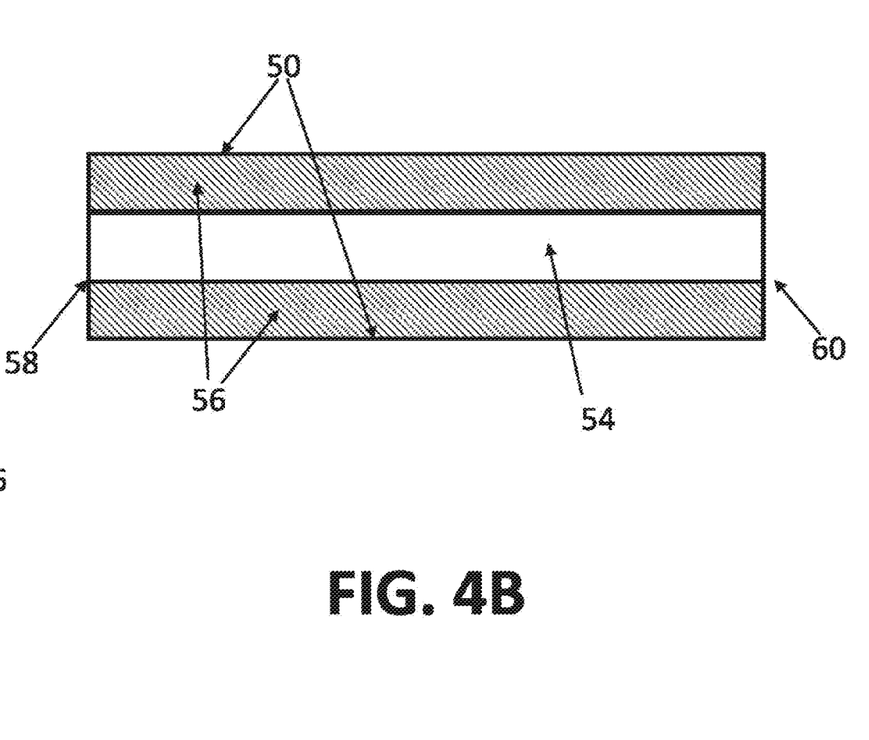
FIG. 4B is a sectional perspective view of the soil amendment of FIG. 1, depicting an interior hollow section.

FIG. 4B shows a longitudinal cross-section of the fertilizer composition of FIG. 4A having an impermeable coating layer 50 coating the soil amendment 56 and an interior hollow section 54 that spans the particle first end 58 and second end 60. The diameter of the interior hollow section is defined by the soil amendment 56.

Figure 5A:
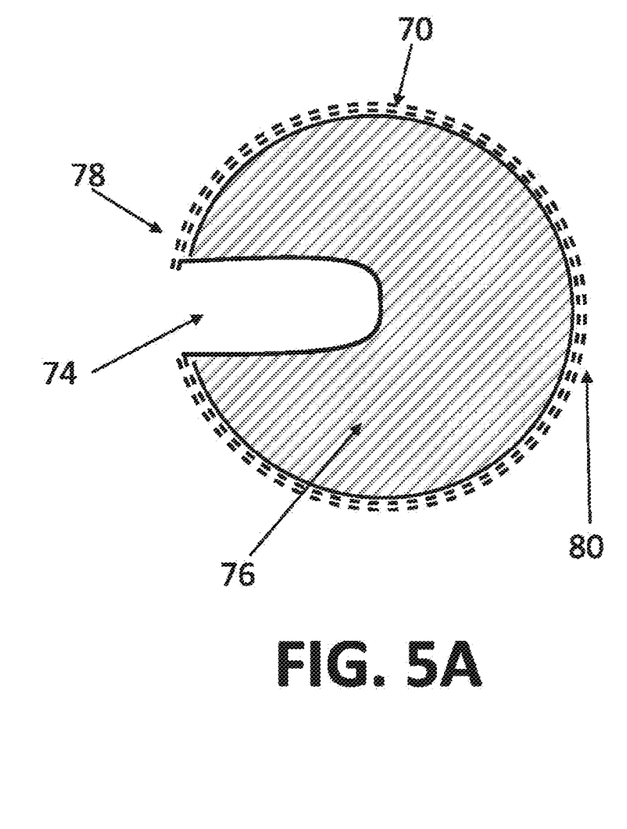
FIG. 5A is a sectional perspective view of a soil amendment having an interior hollow section that partially extends into the particle.

Depicted in FIG. 5A, another embodiment is shown as a fertilizer composition having a single interior hollow section 74 that partially extends into the soil amendment 76 through the particle first end 78 but not extending through to the second end 80. Also present is an impermeable coating layer 70 that substantially covers the soil amendment 76, but does not obstruct the opening of the interior hollow section 74. This embodiment minimizes the loss of soil amendment 76 to the surrounding environment at the cost of decreased access of the soil amendment 76 to plant roots.

Figure 5B:
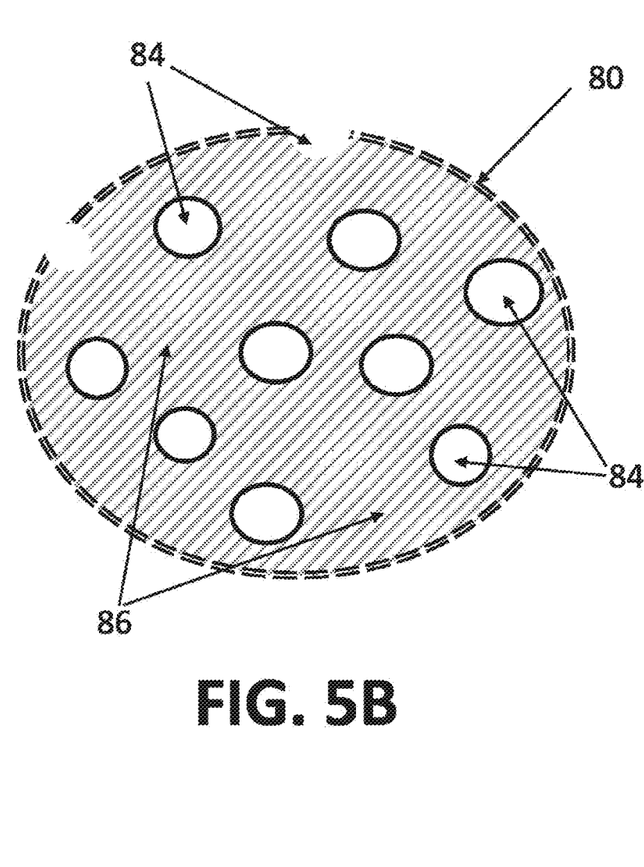
FIG. 5B depicts an embodiment of a soil amendment having a plurality of interior hollow sections.

In another embodiment depicted in FIG. 5B, a cross-section of a fertilizer composition is depicted having an impermeable coating layer 80 coating a soil amendment 86 having a plurality of interior hollow sections 84. The plurality of interior hollow sections 84 can, in various combinations, span the particle first face and second face or only partially extend into the soil amendment 86. This embodiment provides greater access to a soil amendment found on the interior of the particle, at the expense of greater loss of the soil amendment to the surrounding environment. Balancing these considerations, a fertilizer composition preferably has a single interior hollow section 84 that spans the particle first end and second end, providing access to the soil amendment while mitigating its loss to the surrounding environment.

Figure 6:
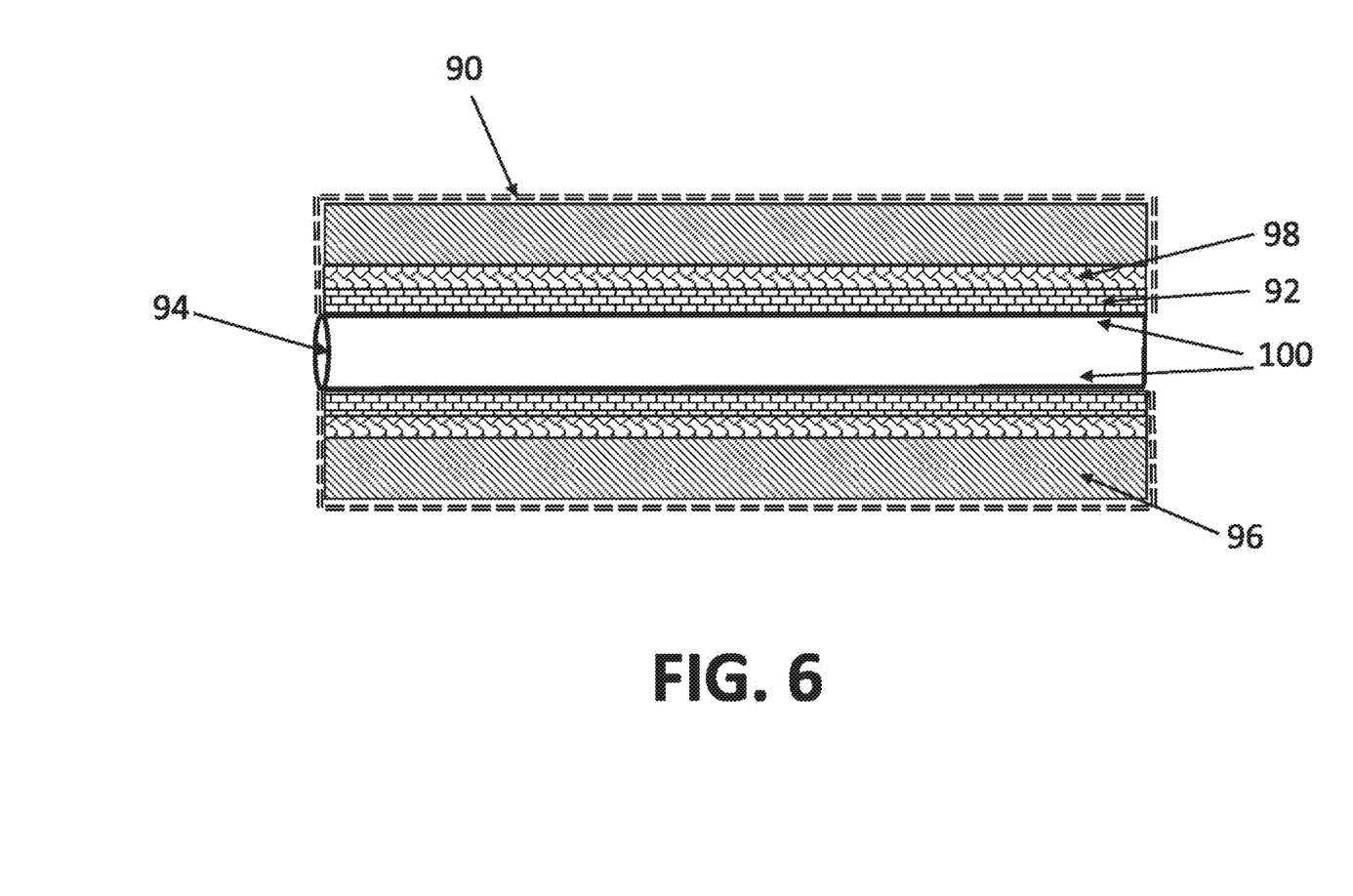
FIG. 6 is a sectional view of a soil amendment composition, depicting various layers of an inner face compatible with one or more embodiments of the present invention.

Referring to FIG. 6, a sectional view of another embodiment of a fertilizer composition is depicted. The interior hollow section 94 spans the length of the particle; however, in alternative embodiments the interior hollow section 94 only partially extends into the particle 10. The interior hollow section 94 is dimensioned to accommodate plant root tips. As such, in one or more embodiments, the interior hollow section 94 has a diameter between about 0.5-5 mm, and preferably about 2.5 mm.

In one or more embodiments of the present invention, the interior hollow section is defined by a sustained-release layer 92. The sustained release layer 92 is further covered by a root attractant layer 98. The root attractant layer is further surrounded by a soil amendment 96, which is coated by an impermeable layer 90. The root attractant layer 92 has a thickness between about 1-5 µm. The root attractant layer will typically be incorporated into the bulk nutrient and mixed prior to particle formation. In another embodiment, the inner sustained-release layer 96 covers the inner root attractant layer 98. The inner sustained-release layer 96 has a thickness between about 1-5 μm and is preferably included in embodiments of the present invention having a plurality of interior hollow sections 94.

In additional embodiments, the pH of the nutrient may be optimized for known applications. For example, in acid tropical soils, the pH of some pellets can be made more basic to enhance nutrient uptake of nutrients, such as molybdenum, that are typically unavailable for root uptake. In calcareous soils, common in the Great Plains and intermountain west, pellets can be formulated to be more acidic than the soil into which they are incorporated, which would make added micronutrients, such as iron, born and magnesium more available to the plant.

In a fashion similar to pH, defined Eh or redox potentials can be created during formulation to improve nutrient uptake in one or more embodiments. For example, reduced ferrous iron is typically thousands of times more soluble than oxidized ferric iron, especially in calcareous soils. Controlled release of ferrous iron to plant roots over a growing season could result in significant yield increases.

One or more embodiments of the present invention could be made by simple extrusion (as in a pasta press) followed by spray coating or by coextrusion where an extruded outer coating is forced over an extruded interior core of materials. Other similar processes of forming particles with various coatings and layers can be utilized to form the compositions discussed herein and are well known to one of ordinary skill in the art.

In addition, nutrient concentrations are dependent upon the crop and the crop stage and the form of nutrients can be manipulated to regulated water vapor driven release rates. Further, because different salts used in fertilizers often have different solubilities, different salts, e.g. calcium phosphate vs. sodium phosphate, along with particle geometry changes, can be selected to match nutrient release rate to plant needs.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

I claim:

1. A soil amendment composition comprising:
a particle having a first end, a second end, an inner face, and an outer face, wherein the particle comprises a soil amendment;
an impermeable layer substantially covering the outer face of the particle, wherein the impermeable layer does not cover at least one of the first or second ends of the particle;
wherein the soil amendment is selected from the group consisting of nutrients, pesticides, microbes, herbicides or combinations thereof; and
further comprising a root attractant layer covering the inner face of the particle.

2. The composition of claim 1, wherein the root attractant is selected from the group consisting of phosphate, glutamate, nitrate or combinations thereof.

3. The composition of claim 1, further comprising a sustained-release layer covering the root attractant layer.

4. A soil amendment composition comprising:
a particle having a first end, a second end, and an outer face, wherein the particle comprises a soil amendment;
an impermeable layer substantially covering the outer face of the particle, wherein the impermeable layer does not cover at least one of the first or second ends of the particle;
the particle further comprises an inner face and an interior hollow section spanning the first and second end that is defined by the inner face of the particle;
wherein the particle is substantially cylindrical with a length of about 5 mm and a diameter of about 3 mm, wherein a single interior hollow section having a diameter of about 2 mm spans the first and second ends, and further wherein the amendment is a nutrient, a phosphate root attractant layer covers the particle inner face, and further wherein a water-impermeable plastic layer covers the particle outer face.

5. A soil amendment composition comprising:
a particle having a first end, a second end, and an outer face, wherein the particle comprises a soil amendment;
an impermeable layer substantially covering the outer face of the particle, wherein the impermeable layer does not cover at least one of the first or second ends of the particle;
the particle further comprises an inner face and an interior hollow section spanning the first and second end that is defined by the inner face of the particle;
wherein the particle is substantially cylindrical with a length of about 5 mm and a diameter of about 3 mm, wherein a single interior hollow section having a diameter of about 2 mm spans the first and second faces of the particle, and further wherein the amendment is a microbe, a water-impermeable plastic layer covers the particle outer face, a root attractant layer covers the impermeable layer, and a sustained-release coating encapsulates the entire particle.

6. A soil amendment composition comprising:
a particle having a first end, a second end, and an outer face, wherein the particle comprises a soil amendment;
an impermeable layer substantially covering the outer face of the particle, wherein the impermeable layer does not cover at least one of the first or second ends of the particle;
wherein the particle is substantially spherical with a diameter of about 5 mm, wherein a plurality of interior hollow sections having diameters of about 0.5 mm span the first and second faces of the particle, and further wherein the amendment is a nutrient, a nitrate root attractant layer covers the particle inner face, a sustained-release coating covers the root attractant layer, and a water-impermeable plastic layer covers the particle outer face.

7. A soil amendment composition comprising:
a particle having a first end, a second end, and an outer face, wherein the particle comprises a soil amendment;
an impermeable layer substantially covering the outer face of the particle, wherein the impermeable layer does not cover at least one of the first or second ends of the particle;
wherein the particle is substantially spherical with a diameter of about 5 mm, wherein a plurality interior hollow sections having diameters of about 0.5 mm span the first and second faces of the particle, and further wherein the amendment is a pesticide, a nitrate root attractant layer covers the particle inner face, a sustained-release coating covers the root attractant layer, and a water impermeable plastic layer covers the particle outer face.

* * * * *